United States Patent
Murata

(10) Patent No.: US 6,187,844 B1
(45) Date of Patent: Feb. 13, 2001

(54) PLASTIC LENS

(75) Inventor: Naoki Murata, Tochigi (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/247,600

(22) Filed: Feb. 10, 1999

(30) Foreign Application Priority Data

Feb. 10, 1998 (JP) .................................. 10-044382
Feb. 10, 1998 (JP) .................................. 10-044383
Nov. 24, 1998 (JP) .................................. 10-332921

(51) Int. Cl.$^7$ .............................. C08K 5/34; C08K 5/29; C08K 5/36

(52) U.S. Cl. ............................ 524/91; 524/196; 524/305

(58) Field of Search ............................... 524/91, 196, 305

(56) References Cited

U.S. PATENT DOCUMENTS 3,141,869   7/1964  Dennstedt ........................ 260/85.5
4,845,180 * 7/1989  Henry et al. ........................ 524/91
5,753,730 * 5/1998  Nagata et al. ..................... 524/136

FOREIGN PATENT DOCUMENTS 0786675   7/1997  (EP) .

* cited by examiner

Primary Examiner—Kriellion Sanders
(74) Attorney, Agent, or Firm—Greenblum & Bernstein, P.L.C.

(57) ABSTRACT

A plastic lens is formed using a plastic lens composition which contains, as its main components, a resin material having a urethane-based resin, and at least one kind of UV absorbent selected from the group comprising 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, 5-di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole, and 2-(3, 5-di-t-butyl-2-hydroxyphenyl) benzotriazole. The total amount of addition of the UV absorbants is preferably in the range of 0.02 to 2.0 wt % relative to 100 wt % of the resin material.

20 Claims, No Drawings

PLASTIC LENS

BACKGROUND OF THE INVENTION

1. Field of the Invention

The present invention relates to a plastic lens, and more particularly to a plastic lens formed of a urethane-based resin having a UV absorptive function.

2. Description of the Prior Art

Plastic lenses have various advantages as compared with glass lenses. For example, plastic lenses have a relatively light-weight and are less vulnerable to breakage in comparison with glass lenses. Further, plastic lenses are colorable, and precision molding thereof can be easily carried out. In view of these advantages, in recent years, plastic lenses are widely used for optical lens products such as an eye-glass lens, camera lens, Fresnel lens, lenticular lens, prism and the like.

Among these plastic lenses, a plastic lens formed of a urethane-based resin has less optical distorsions and it has a high safety due to its excellent transparency and superior impact resistance, so that such a lens is preferably used as an eye-glass lens or the like.

In addition, plastic lenses to which UV absorptive function (UV absorptive power) is imparted have been proposed in order to protect the crystalline lens, the retina and the like from the injury by the UV. The UV absorptive function is imparted, for example, by forming a plastic lens using a resin material for plastic lens which has UV absorptive function in itself, or by providing a coating layer formed of an UV absorbent having UV absorptive function on the surface of the molded plastic lens.

However, in these methods, there have been problems such as yellowing of the lens and changes in the index of refraction of the lens due to the own color (yellow) of the resin material for the plastic lens or the UV absorbent. Moreover, there have also been such problems as the deterioration in the mechanical strength and the deterioration of transparency of the lens due to the addition of the UV absorbent and the addition of a color complementing agent which is added for the purpose of adjusting the yellowing to be caused by the UV absorbent.

SUMMARY OF THE INVENTION

It is therefore an object of the present invention to provide a plastic lens which does not cause yellowing and changes in the index of refraction and the transparency as well as deterioration in the mechanical strength which are to be caused by the addition of the UV absorbent.

In order to achieve the above object, the plastic lens according to the present invention is formed using a composition for plastic lens which contains, as its main components, a resin material having a urethane-based resin component and at least one kind of UV absorbent selected from the group comprising 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, 5-di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3, 5-di-t-butyl-2-hydroxyphenyl) benzotriazole.

According to the plastic lens of the present invention described above, it is possible to avoid the yellowing of the lens due to the addition of the UV absorbent while exhibiting an excellent UV absorptive function.

Moreover, in order to achieve the above object, it is preferable that the above plastic lens composition contains as the UV absorbent a compound whose maximum absorption wavelength in a chloroform solution is less than 345 nm.

Further, it is preferable that the plastic lens composition contains as the UV absorbent a compound whose maximum absorption wavelength in the chloroform solution is not less than 345 nm.

Further, it is preferable that the total amount of addition of the UV absorbent in the plastic lens according to this invention is in the range of 0.02 to 2.0 wt % relative to 100 wt % of the resin material.

Further, it is preferable that the urethane-based resin component contains a mercapto group containing compound. In this case, it is preferred that the mercapto group containing compound includes at least either one of pentaerythritoltetrakis (3-mercaptopropionate) and 4-mercaptomethyl-3, 6-dithio-1, 8-octanedithiol.

Further, it is preferable that the urethane-based resin component contains an isocyanate group containing compound. More preferably, the isocyanate group containing compound includes at least either one of m-xylylenediisocyanate and 2, 5 (2, 6)-bicyclo [2,2,1] heptanebis-(isocyanatemethyl) norbornanediisocyanatemethyl.

In the present invention, it is also preferred that the urethane-based resin component contains a mercapto group containing compound and an isocyanate group containing compound. In this case, it is preferred that the mercapto group containing compound includes pentaerythritoltetrakis (3-mercaptopropionate), and said isocyanate group containing compound includes m-xylylenediisocyanate. Further, it is also preferred that the mercapto group containing compound includes 4-mercaptomethyl-3, 6-dithio-1, 8-octanedithiol, and said isocyanate group containing compound includes m-xylylenediisocyanate. Furthermore, It is also preferred that the mercapto group containing compound includes pentaerythritoltetrakis (3-mercaptopropionate) and 4-mercaptomethyl-3, 6-dithio-1, 8-octanedithiol, and the isocyanate group containing compound includes 2, 5 (2, 6)-bicyclo [2,2,1] heptanebis-(isocyanatemethyl) norbornanediisocyanatemethyl.

Further, it is preferable that the plastic lens composition contains 0.01 to 10 ppm of a bluing agent.

Further, it is preferable that the plastic lens according to the present invention has a spectroscopic transmissivity of not more than 10% for a radiation with wavelength of 400 nm in a lens thickness of 2 mm.

Further, it is preferable that the plastic lens according to the present invention has a yellow Index (YI value) of not more than 1.5 for a lens thickness of 2 mm.

Further, since the plastic lens according to the present invention maintains mechanical strength and high index of refraction, it is possible to use it for a wide range of applications as optical lenses such as safe and high precision eye-glass lenses.

Other objects, constitutions and advantages of the present invention will become more apparent from the following description of the invention and the Examples.

DESCRIPTION OF THE INVENTION

Hereinbelow, the plastic lens according to the present invention will be described in detail.

The feature of the plastic lens according to the present invention resides in that it is formed using a composition for plastic lens which contains, as its main components, a resin material having a urethane-based resin component, and at least one kind of UV absorbent selected from the group comprising 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, 5-di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3,5-di-t-butyl-2-hydroxyphenyl) benzotriazole.

With this arrangement, it is possible to suppress yellowing of the lens caused by the color of the added UV absorbent while imparting UV absorptive function to the plastic lens.

In the present invention, at least one kind selected from the group comprising 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, 5-di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3, 5-di-t-butyl-2-hydroxyphenyl) benzotriazole is used as the UV absorbent.

These UV absorbents have an excellent compatibility especially with the resin material used in this invention, so that no bleed-out of the UV absorbents occurs at the time of polymerization or during the use of the lens. Therefore, there is no possibility of spoiling of the appearance of the lens, deterioration in the characteristics of the lens and degradation of the lens quality.

In the present invention, it is preferable that the plastic lens composition contains compounds whose maximum absorption wavelength in a chloroform solution is less than 345 nm as UV absorbents. With this choice, it is possible to obtain a plastic lens which can efficiently exhibit UV absorptive function, in particular the UV absorptive function for a specified wavelegth, and is free from yellowing.

As compounds whose maximum absorption wavelength in the chloroform solution is less than 345 nm, there may be mentioned, for example, 2-(5-methyl-2-hydroxy-phenyl) benzotriazole, 2-(5-t-butyl-2-hydroxyphenyl) benzotriazole, and 2-(5-t-octyl-2-hydroxyphenyl) benzotriazole. These compounds may be used separately or in combination of two or more kinds.

In addition, it is also preferable that the plastic lens composition contains compounds whose maximum absorption wavelength in the chloroform solution is not less than 345 nm. With this arrangement, it is possible to obtain a plastic lens which can efficiently exhibit UV absorptive function, in particular the UV absorptive function for a specified wavelength, and is free from yellowing.

As compounds whose maximum absorption wavelength in the chloroform solution is not less than 345 nm, there may be mentioned, for example, 2-(3, 5-di-t-butyl-2-hydroxyphenyl)-5-chlorobenzotriazole, 2-(3-t-butyl-5-methyl-2-hydroxyphenyl)-5-chlorobenzotriazple, 2-(3, 5-di-t-amyl-2-hydroxyphenyl) benzotriazole, and 2-(3, 5-di-t-butyl-2-hydroxyphenyl) benzotriazole. These compounds may be used separately or in combination of two or more kinds.

In this invention, the total amount of addition of the UV absorbents is preferable to be in the range of 0.02 to 2.0 wt %, and more preferably 0.4 to 2.0 wt % relative to 100 wt % of the resin material. If the total amount of addition of the UV absorbents is less than 0.02 wt %, there are cases where sufficient UV absorption effect may not be obtained, whereas if it exceeds 2.0 wt %, there may occur changes in the optical characteristics such as yellowing and deterioration in the index of refraction of the lens, as well as there is a possibility of having reduction in the mechanical strength of the lens.

Here, the order of addition and the method for combining the UV absorbents are not particularly limited. They may be added at any stage of polymerization process of the resin material or may be added after the polymerization.

The plastic lens according to the present invention is formed using a resin material which contains urethane-based resins as its main component.

By the use of such a resin material containing urethane-based resins as its main component, it is possible to obtain a useful plastic lens which has satisfactory transparency, impact resistance, heat resistance and resistance to chemicals which are required for lens products, especially for the use as optical lenses. Further, such a plastic lens has a high index of refraction and also has excellent surface hardness and mechanical strength. Moreover, it is possible to suppress the reduction in the mechanical strength of the lens caused by the addition of the UV absorbents.

In the present invention, it is preferred that the urethane-based resin component includes mercapto group containing compounds. With this choice, it is possible to improve the index of refraction of the plastic lens. Further, it is also possible to obtain a plastic lens which is optically homogeneous and shows hardly any optical distortion.

As for examples of mercapto group containing compounds, there are imposed no specific limitations so long as they have a high compatibility with other urethane-based resin components and other components in the plastic lens composition. There may be mentioned, for example, aliphatic thiol compounds, alicyclic thiol compounds, aromatic thiol compounds and heterocycle containing thiol compounds and the like. These compounds may be used separately or in combination of two or more kinds.

In particular, as for mercapto group containing compounds for this invention, it is preferable to include at least either one of pentaerythritoltetrakis (3-mercapto-propionate) and 4-mercaptomethyl-3, 6-dithio-1, 8-octanedithiol.

Further, it is preferable that the urethane-based resin component includes isocyanate group containing compounds. With this choice, it is possible to improve the index of refraction of the plastic lens. Further, it is also possible to obtain a plastic lens which is optically homogeneous and shows hardly any optical distortion.

As for examples of isocyanate group containing compounds, there are no specific limitations so long as they have a satisfactory compatibility with other urethane based resin components and other components in the plastic lens composition. For examples, compounds containing aromatic and aliphatic isocyanate groups may be mentioned. These compounds may be used separately or in combination of two or more kinds.

According to the present invention, it is especially preferable that the isocyanate group containing compound includes at least either one of m-xylylenediisocyanate and 2, 5 (2, 6)-bicyclo [2, 2, 1] heptanebis-(isocyanatemethyl) norbornanediisocyanate-methyl.

Furthermore, it is also preferred that the urethane-based resin component includes the above-described mercapto group containing compounds and the above-described isocyanate group containing compounds.

When these isocyanate group containing compounds are combined with the above mercapto group containing compounds, it is possible to obtain a plastic lens which has excellent mechanical strength and shows hardly any changes in the optical characteristics such as the index of refraction due to addition of the UV absorbents, in addition to the above-mentioned effects obtained from the respective compounds.

Among the possible combinations of the mercapto group containing compounds and the isocyanate group containing compounds, any one of the following combinations (1) to (3) is particularly preferred. (1) The mercapto group containing compound is pentaerythritoltetrakis (3-mercaptopropionate), and the isocyanate group containing compound is m-xylylenediisocyanate. (2) The mercapto group containing compound is 4-mercaptomethyl-3, 6-dithio-1, 8-octanedithiol, and the isocyanate group containing compound is m-xylylenediisocyanate. (3) The mercapto group containing compound is pentaerythritoltetrakis (3-mercaptopropionate) and 4-mercaptomethyl-3, 6-dithio-1, 8-octanedithiol, and the isocyanate group containing compound is 2, 5 (2, 6)-bicyclo [2,2,1] heptanebis-(isocyanatemethyl) norbornanediisocyanatemethyl.

When any one of these combinations is used, it is possible to obtain a very excellent plastic lens which has a higher index of refraction and has more excellent impact resistance and mechanical strength and which shows hardly any changes in the optical characteristics due to addition of the UV absorbents.

Moreover, when the resin material containing the mercapto group containing compounds and the isocyanate group containing compounds is combined with the UV absorbents mentioned above, it is possible to conspicuously exhibit the improved effect of the UV absorptive function and the effect of suppressing the yellowing of the lens.

In combining the isocyanate group containing compounds with the mercapto group containing compounds, the mixing ratio of both is not particularly limited, but it is preferable that a molar ratio of the isocyante group containing compounds to the mercapto group containing compounds (—NCO/—SH) is 0.5 to 3.0, it is more preferable that the ratio lies in the range of 0.5 to 1.5 and it is most preferable that the ratio is 1.0. Using the urethane-based resin component containing the isocyanate group containing compounds and the mercapto group containing compounds of the above ratio, it becomes possible to obtain a plastic lens having an excellent index of refraction and an excellent workability.

Further, the urethane-based resin component may contain catalysts or other additives besides the mercapto group containing compounds and the isocyanate group containing compounds.

Further, it is preferable that the plastic lens composition contains a bluing agent as a color complementing agent. In this way, it is possible to cancel, for example, even a slight yellowing due to the own color of the resin material or the UV absorbent.

The amount of the bluing agent to be added is preferably set in the range of 0.01 to 10 ppm, and more preferably 0.1 to 1 ppm. If the added amount of the bluing agent is too small, it is sometimes not possible to cancel the yellowing of the lens, whereas if it is too large, absorption by the bluing agent becomes too strong and gives rise to the possibility of degrading the transmissivity of the lens.

There is no particular limitations on the bluing agent so long as it is applicable to the resin material having a urethane-based resin as its main component. For example, an anthraquinone-based compound, phthalocyanine-based compound, monoazo-based compound, diazo-based compound and triallylmethane-based compound may be mentioned.

Using the plastic lens composition mentioned above, it is possible to fabricate a plastic lens according to the present invention by molding the composition into a predetermined shape by means of a general molding method such as cast polymerization, injection molding, extrusion molding or the like.

Further, according to the present invention, it is preferable that the plastic lens has a spectroscopic transmissivity of not more than 10% for a radiation with wavelength of 400 nm in a lens of thickness 2 mm, and more preferably has a spectroscopic transmissivity of not more than 5%.

In this way, it is possible to provide the plastic lens which can effectively absorb UV radiations, especially the UV-A and UV-B components that are harmful to the living tissues. Further, such a plastic lens is excellent in safety.

Further, according to the present invention, it is preferable that the plastic lens has a yellow index (YI value) of not more than 1.5, when its has a lens thickness of 2 mm. When the yellow index (YI value) exceeds 1.5, there is a case that the plastic lens has a yellow tint.

The plastic lens described above is preferably used as optical lenses. More specifically, examples of the optical lenses include eye-glass lens, contact lens, Fresnel lens, rod lens, lenticular lens, fθ lens and the like. Among these examples, the use for eye-glass lens is especially preferable.

Therefore, when the plastic lens is used for the eye-glass lens, the eye-glass lens can protect the crystalline lens and the retina from the harmful UV radiations. That is, it is possible to obtain a useful eye-glass lens with excellent safety.

Although the plastic lens according to the present invention has been described in the above, the present invention is not limited only to those described above. For example, the present invention can be applied to plastic lenses which are formed by adding, as needed, various kinds of additives such as varieties of catalysts, antioxidants, pigments, anti-settling agents, antifoaming agents, antistatic agents, anti-clouding agents and the like to the plastic lens composition mentioned above, in addition to the bluing agents.

In addition, the plastic lens according to this invention may be one which is subjected to a chemical or physical treatment such as for improving the anti-reflectivity, resistance to ablation and resistance to chemicals. Further, surface polishing, antistatic treatment and hard coating may be made.

EXAMPLES

Next, specific Examples of the present invention will be described.

1. Fabrication of Plastic Lens (Example 1)

A 2 mm-thick nondioptric plastic lens made of a urethane-based resin was fabricated using a plastic lens composition containing the following resin material, UV absorbent and an additive (bluing agent used as a color complementing agent).

<Resin Material>

Urethane-Based Resin Component

| | | |
|---|---|---|
| (1) | Isocyanate group containing compound m-xylylenediisocyanate: | 43.5 wt % |
| (2) | Mercapto group containing compound Pentaerythritoltetrakis (3-mercaptopropionate): | 56.5 wt % |

<UV Absorbent>

| | |
|---|---|
| 2-(3,5-di-t-butyl-2-hydroxyphenyl)benzotriazole (λ max: 345 nm): | 0.4 wt % |
| <Additive> | |
| Bluing agent: "Diaresin Blue J" provided by Mitsubishi Chemical Co.: | 0.6 ppm |

Using these materials, first, a monomer mixed solution was prepared by mixing 100 wt % of the resin material with 0.02 wt % of dibutyltindichloride as a catalyst.

Then, the above UV absorbent and the bluing agent were added to the monomer mixed solution, and mixed well to obtain a homogeneous solution.

Next, after deaeration, the mixed solution was cast in the molds and thermally polymerized to form a plastic lens molding.

The constituent materials of the plastic lens composition and the constitution thereof are shown in Table 1.

(Example 2)

A plastic lens was fabricated in the same way as in Example 1 except for the use of 51.5 wt % of m-xylylenediisocyanate as an isocyanate group containing compound and 48.5 wt % of 4-mercaptomethyl-3, 6-dithio-1, 8-octanedithiol as a mercapto group containing compound.

The constituent materials of the plastic lens composition and the constitution thereof are shown in Table 1.

(Example 3)

A plastic lens was fabricated in the same way as in Example 1 except for the addition of 0.4 wt % of 2-(3, 5-di-t-amyl-2-hydroxyphenyl) benzotriazole (λ max: 346 nm) as a UV absorbent.

The constituent materials of the plastic lens composition and the constitution thereof are shown in Table 1.

(Example 4)

A plastic lens was fabricated in the same way as in Example 2 except for the addition of 2.0 wt % of 2-(3, 5-di-t-amyl-2-hydroxyphenyl) benzotriazole as a UV absorbent.

The constituent materials of the plastic lens composition and the constitution thereof are shown in Table 1.

(Example 5)

A plastic lens was fabricated in the same way as in Example 1 except for the addition of 0.01 wt % of 2-(3, 5-di-t-butyl-2-hydroxyphenyl)-5-chlorobenzotriazole and 0.01 wt % of 2-(3-t-butyl-5-methyl-2-hydroxyphenyl)-5-chlorobenzotriazole as the UV absorbents.

The constituent materials of the plastic lens composition and the constitution thereof are shown in Table 1.

(Example 6)

A plastic lens was fabricated in the same way as in Example 3 except for the use of
- 50.6 wt % of 2, 5 (2, 6)-bicyclo [2, 2, 1] heptanebis-(isocyanatemethyl) norbornanediisocyanatemethyl as an isocyanate group containing compound, and
- 23.9 wt % of pentaerythritoltetrakis (3-mercaptopropionate) and 25.5 wt % of 4-mercaptomethyl-3, 6-dithio-1, 8-octanedithiol as the mercapto group containing compounds, and except for changing the amount of addition of the UV absorbent and the amount of addition of the bluing agent, and changing the amount of addition of the catalyst (dibutyltindichloride) from 0.02 wt % to 0.05 wt %.

The constituent materials of the plastic lens composition and the constitution thereof are shown in Table 1.

(Example 7)

A plastic lens was fabricated in the same way as in Example 1 except for the addition of 2.0 wt % of 2-(5-methyl-2-hydroxyphenyl) benzotriazole (λ max: 340 nm) as a UV absorbent.

The constituent materials of the plastic lens composition and the constitution thereof are shown in Table 2.

(Example 8)

A plastic lens was fabricated in the same way as in Example 7 except for the use of 51.5 wt % of m-xylylenediisocyanate as an isocyanate group containing compound, and 48.5 wt % of 4-mercaptomethyl-3, 6-dithio-1, 8-octanedithiol as a mercapto group containing compound.

The constituent materials of the plastic lens composition and the constitution thereof are shown in Table 2.

(Example 9)

A plastic lens was fabricated in the same way as in Example 1 except for the addition of 2.0 wt % of 2-(5-t-octyl-2-hydroxyphenyl) benzotriazole (λ max: 340 nm) as a UV absorbent.

The constituent materials of the plastic lens composition and the constitution thereof are shown in Table 2.

(Example 10)

A plastic lens was fabricated in the same way as in Example 8 except for the addition of 2.0 wt % of 2-(5-t-octyl-2-hydroxyphenyl) benzotriazole as a UV absorbent.

The constituent materials of the plastic lens composition and the constitution thereof are shown in Table 2.

(Example 11)

A plastic lens was fabricated in the same way as in Example 7 except for the addition of 1.0 wt % of 2-(5-t-butyl-2-hydroxyphenyl) benzotriazole (λ max: 340 nm) as a UV absorbent.

The constituent materials of the plastic lens composition and the constitution thereof are shown in Table 2.

(Comparative Example 1)

A 2 mm-thick nondioptric polycarbonate resin plastic lens was fabricated using the following plastic lens composition.

<Resin Material>

| | |
|---|---|
| Polycarbonate resin powder: | 100 wt % |

<UV Absorbent>

| | |
|---|---|
| 2-(3-t-butyl-5-methyl-2-hydroxyphenyl)-5-clorobenzotriazole (λ max: 353 nm): | 0.02 wt % |

<Additive>

| | |
|---|---|
| Bluing agent: "Diaresin Blue J" provided by Mitsubishi Chemical Co.: | 0.6 ppm |

A plastic lens molding was obtained by mixing the above polycarbonate resin powder, the UV absorbent and the bluing agent, and then by injection molding such mixture.

The constituent materials of the plastic lens composition and the constitution thereof are shown in Table 2.

(Comparative Example 2)

A plastic lens molding was obtained in the same way as in Comparative Example 1 except for the addition of 0.33 wt % of 2-(2'-hydroxy-5'-t-octylphenyl) benzotriazole (λ max: 340 nm) as a UV absorbent.

The constituent materials of the plastic lens composition and the constitution thereof are shown in Table 2.

2. Performance Evaluation of the Plastic Lens

The following performance evaluation was carried out for each of the plastic lenses fabricated by Examples 1 to 11 and Comparative Examples 1 and 2.

(1) Yellow Index (YI Value)

Measurements were taken according to JIS K7200. The measured values were evaluated for the following three stages.

| | |
|---|---|
| YI value not more than 1.5 | ○ |
| YI value between 1.5 and 2.0 | Δ |
| YI value not less than 2.0 | X |

(2) UV Absorptive Function

The spectroscopic transmissivity for wavelength 400 nm was measured using a spectrophotometer U-3200 (manufactured by Hitachi, Ltd.).

(3) Index of Refraction

The index of refraction for the D line (wavelength of 589.3 nm) was measured at 20° C. using an Abbe's refractometer.

In addition, the index of refraction of a plastic lens with addition of UV absorbents, and the index of refraction of a plastic lens fabricated under the same conditions except for non-addition of the UV absorbents (both samples have 2 mm thickness and are formed into nondioptric lens) are compared, and the cases where no change were observable are marked with ○, and the cases where there were observed changes are marked with X.

(4) Mechanical Strength

The mechanical strength of the plastic lenses fabricated by Examples 1 to 11 and Comparative Examples 1 and 2, and the mechanical strength of the plastic lenses fabricated using the same resin materials as those used in respective cases of the Examples and the Comparative Examples and using the plastic lens composition containing no UV absorbent (both samples have 2 mm thickness and are formed into nondioptric lens) are compared. The case of the plastic lens of the Examples in which the mechanical strength is lower compared with the mechanical strength of the plastic lens containing no UV absorbent is marked with X, and the case in which the mechanical strength is equal to or higher is marked with ○.

The comparison of the mechanical strength was carried out according to the Charpy impact test (JIS K7111), and the result is shown in Table 3.

From the above result, it was found that all of the plastic lenses of Examples 1 to 11 show neither yellowing of the lens nor deterioration in the mechanical strength while exhibiting an excellent UV absorptive function, and can maintain a high index of refraction.

On the other hand, each plastic lens of the Comparative Examples was markedly inferior in UV absorptive function, and showed a reduction in the mechanical strength upon addition of the UV absorbent.

As described in the above, the plastic lens according to the present invention does not show yellowing of the lens due to the addition of the UV absorbents while exhibiting an excellent UV absorptive function. Moreover, it maintains mechanical strength and high index of refraction so that it can be used widely as optical lenses such as safe and high precision eye-glass lenses.

Finally, it is to be noted that the present invention is not limited to the above Examples, and any changes and modifications can be made without departing from the scope of the present invention which is defined by the following claims.

Further, it is also to be noted that the present disclosure relates to subject matter contained in Japanese patent applications No. 10-44382 (filed on Feb. 10, 1998), No. 10-44383 (filed on Feb. 10, 1998) and No. 10-332921 (filed on Nov. 24, 1998) which are expressly incorporated therein by reference in their entireties.

TABLE 1

| | Composition for Plastic Lens | | | | | |
|---|---|---|---|---|---|---|
| | Resin Material [wt %] | | Ratio of —NCO/SH | UV Absorbent Maximum Absorption Wavelength (nm) | [wt %] | Bluing Agent [ppm] |
| Example 1 | m-xylylenediisocyanate | 43.5 | 1:1 | 2-(3,5-di-t-butyl-2-hydroxyphenyl)-benzotriazole (345 nm) | 0.4 | 0.6 |
| | pentaerythritoltetrakis (3-mercaptopropionate) | 56.5 | | | | |
| Example 2 | m-xylylenediisocyanate | 51.5 | 1:1 | 2-(3,5-di-t-butyl-2-hydroxyphenyl)-benzotriazole (345 nm) | 0.4 | 0.6 |
| | 4-mercaptomethyl-3,6-dithio-1,8-octanedithiol | 48.5 | | | | |
| Example 3 | m-xylylenediisocyanate | 43.5 | 1:1 | 2-(3,5-di-t-amyl-2-hydroxyphenyl)-benzotriazole (346 nm) | 0.4 | 0.6 |
| | pentaerythritoltetrakis (3-mercaptopropionate) | 56.5 | | | | |
| Example 4 | m-xylylenediisocyanate | 51.5 | 1:1 | 2-(3,5-di-t-amyl-2-hydroxyphenyl)-benzotriazole (346 nm) | 2.0 | 0.6 |
| | 4-mercaptomethyl-3,6-dithio-1,8-octanedithiol | 48.5 | | | | |
| Example 5 | m-xylylenediisocyanate | 43.5 | 1:1 | 2-(3,5-di-t-butyl-2-hydroxyphenyl)-5-chlorobenzotriazole (351 nm) | 0.01 | 0.6 |
| | pentaerythritoltetrakis (3-mercaptopropionate) | 56.5 | | 2-(3-t-butyl-5-methyl-2-hydroxyphenyl)-5-chlorobenzotriazole (353 nm) | 0.01 | |
| Example 6 | 2,5(2,6)-bicyclo[2,2,1]heptanebis-(isocyanatemethyl) norbornanediisocyanatemethyl | 50.6 | 1:1 | 2-(3,5-di-t-amyl-2-hydroxyphenyl) benzotriazole (346 nm) | 0.6 | 0.8 |
| | pentaerythritoltetrakis (3-mercaptopropionate) | 23.9 | | | | |
| | 4-mercaptomethyl-3,6-dithio-1,8-octanedithiol | 25.5 | | | | |

TABLE 2

Composition for Plastic Lens

|  | Resin Material [wt %] |  | Ratio of —NCO/SH | UV Absorbent Maximum Absorption Wavelength (nm) [wt %] |  | Bluing Agent [ppm] |
|---|---|---|---|---|---|---|
| Example 7 | m-xylylenediisocyanate pentaerythritoltetrakis (3-mercaptopropionate) | 43.5 56.5 | 1:1 | 2-(5-methyl-2-hydroxyphenyl)benzotriazole (340 nm) | 2.0 | 0.6 |
| Example 8 | m-xylylenediisocyanate 4-mercaptomethyl-3,6-dithio-1, 8-octanedithiol | 51.5 48.5 | 1:1 | 2-(5-methyl-2-hydroxyphenyl)benzotriazole (340 nm) | 2.0 | 0.6 |
| Example 9 | m-xylylenediisocyanate pentaerythritoltetrakis (3-mercaptopropionate) | 43.5 56.5 | 1:1 | 2-(5-t-octyl-2-hydroxyphenyl) benzotriazole (340 nm) | 2.0 | 0.6 |
| Example 10 | m-xylylenediisocyanate 4-mercaptomethyl-3,6-dithio-1, 8-octanedithiol | 51.5 48.5 | 1:1 | 2-(5-t-octyl-2-hydroxyphenyl) benzotriazole (340 nm) | 2.0 | 0.6 |
| Example 11 | m-xylylenediisocyanate pentaerythritoltetrakis (3-mercaptopropionate) | 43.5 56.5 | 1:1 | 2-(5-t-butyl-2-hydroxyphenyl) benzotriazole (340 nm) | 1.0 | 0.6 |
| Comp. Ex. 1 | Polycarbonate resin powder (Viscosity-Average Molecular Weight 23,700) | 100 |  | 2-(3-t-butyl-5-methyl-2-hydroxyphenyl)- 5-chlorobenzotriazole (353 nm) | 0.02 | 0.6 |
| Comp. Ex. 2 | Polycarbonate resin powder (Viscosity-Average Molecular Weight 23,700) | 100 |  | 2-(2'-hydroxy-5'-t-octylphenyl) benzotriazole (340 nm) | 0.33 | 0.6 |

TABLE 3

|  | Yellow Index (YI) | Spectroscopic Transmissivity 400 nm(%) | Index of Refraction | Changes in Index of Refraction | Changes in Mechanical Strength |
|---|---|---|---|---|---|
| Example 1 | ◯ | 5 | 1.594 | ◯ | ◯ |
| Example 2 | ◯ | 5 | 1.659 | ◯ | ◯ |
| Example 3 | ◯ | 5 | 1.594 | ◯ | ◯ |
| Example 4 | ◯ | 5 | 1.659 | ◯ | ◯ |
| Example 5 | ◯ | 5 | 1.594 | ◯ | ◯ |
| Example 6 | ◯ | ≦3% | 1.592 | ◯ | ◯ |
| Example 7 | ◯ | 5 | 1.592 | ◯ | ◯ |
| Example 8 | ◯ | 5 | 1.657 | ◯ | ◯ |
| Example 9 | ◯ | 5 | 1.592 | ◯ | ◯ |
| Example 10 | ◯ | 5 | 1.657 | ◯ | ◯ |
| Example 11 | ◯ | 5 | 1.592 | ◯ | ◯ |
| Comp. Ex. 1 | ◯ | 85 | 1.585 | ◯ | X |
| Comp. Ex. 2 | ◯ | 80 | 1.585 | ◯ | X |

What is claimed is:

1. A plastic lens which is formed using a composition for plastic lens, the composition comprising, as its main components,:
   resin material having urethane-based resin component including a mercapto group containing compound and an isocyanate group containing compound, said mercapto group containing compound including pentaerythritoltetrakis (3-mercaptopropionate) and 4-mercaptomethyl-3, 6-dithio-1, 8-octanedithiol, and said isocyanate group containing compound including 2, 5 (2, 6)-bicyclo [2,2,1] heptanebis-(isocyanatemethyl) norbornanediisocyanatemethyl; and
   UV absorbent comprising at least one of 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3, 5-di-t-butyl-2-hydroxyphenyl) benzotriazole.

2. The plastic lens as claimed in claim 1, wherein said plastic lens composition contains as the UV absorbent a compound whose maximum absorption wavelength in a chloroform solution is less than 345 nm.

3. The plastic lens as claimed in claim 1, wherein said plastic lens composition contains as the UV absorbent a compound whose maximum absorption wavelength in a chloroform solution is not less than 345 nm.

4. The plastic lens as claimed in claim 1, wherein a total amount of addition of UV absorbent is in a range of 0.02 to 2.0 wt % relative to 100 wt % of the resin material.

5. The plastic lens as claimed in claim 1, said isocyanate group containing compound additionally comprising m-xylylenediisocyanate.

6. The plastic lens as claimed in claim 1, wherein the plastic lens composition contains 0.01 to 10 ppm of a bluing agent.

7. The plastic lens as claimed in claim 1, wherein the plastic lens comprises an eye-glass lenses.

8. A plastic lens which is formed using a composition for plastic lens, the composition comprising, as its main components,:
   resin material having urethane-based resin component including a mercapto group containing compound and an isocyanate group containing compound, said mercapto group containing compound including pentaerythritoltetrakis (3-mercaptopropionate) and 4-mercaptomethyl-3, 6-dithio-1, 8-octanedithiol, and said isocyanate group containing compound including m-xylylenediisocyanate; and UV absorbent comprising at least one of 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3, 5-di-t-butyl-2-hydroxyphenyl) benzotriazole.

9. The plastic lens as claimed in claim 8, wherein said plastic lens composition contains as the UV absorbent a compound whose maximum absorption wavelength in a chloroform solution is less than 345 nm.

10. The plastic lens as claimed in claim 8, wherein said plastic lens composition contains as the UV absorbent a compound whose maximum absorption wavelength in a chloroform solution is not less than 345 nm.

11. The plastic lens as claimed in claim 8, wherein a total amount of addition of UV absorbent is in a range of 0.02 to 2.0 wt % relative to 100 wt % of the resin material.

12. The plastic lens as claimed in claim 8, wherein the plastic lens composition contains 0.01 to 10 ppm of a bluing agent.

13. The plastic lens as claimed in claim 8, wherein the plastic lens comprises an eye-glass lenses.

14. A plastic lens which is formed using a composition for plastic lens, the composition comprising, as its main components,:

resin material having urethane-based resin component including a mercapto group containing compound and an isocyanate group containing compound, said mercapto group containing compound including pentaerythritoltetrakis (3-mercaptopropionate), and said isocyanate group containing compound including m-xylylenediisocyanate and 2, 5 (2, 6)-bicyclo [2,2,1] heptanebis-(isocyanatemethyl) norbornanediisocyanatemethyl; and UV absorbent comprising at least one of 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3, 5-di-t-butyl-2-hydroxyphenyl) benzotriazole.

15. A plastic lens which is formed using a composition for plastic lens, the composition comprising, as its main components,:

resin material having urethane-based resin component including a mercapto group containing compound and an isocyanate group containing compound, said mercapto group containing compound including 4-mercaptomethyl-3, 6-dithio-1, 8-octanedithiol, and said isocyanate group containing compound including m-xylylenediisocyanate and 2, 5 (2, 6)-bicyclo [2,2,1] heptanebis-(isocyanatemethyl) norbornanediisocyanatemethyl; and UV absorbent comprising at least one of 2-(5-methyl-2-hydroxyphenyl) benzotriazole, 2-(5-t-butyl-2-hydroxyphenyl) benzotriazole, 2-(5-t-octyl-2-hydroxyphenyl) benzotriazole, 2-(3, di-t-butyl-2-hydroxyphenyl)-5-chlorobenzotriazole, 2-(3-t-butyl-5-methyl-2-hydroxyphenyl)-5-chlorobenzotriazole, 2-(3, 5-di-t-amyl-2-hydroxyphenyl) benzotriazole and 2-(3, 5-di-t-butyl-2-hydroxyphenyl) benzotriazole.

16. The plastic lens as claimed in claim 15, wherein said plastic lens composition contains as the UV absorbent a compound whose maximum absorption wavelength in a chloroform solution is less than 345 nm.

17. The plastic lens as claimed in claim 15, wherein said plastic lens composition contains as the UV absorbent a compound whose maximum absorption wavelength in a chloroform solution is not less than 345 nm.

18. The plastic lens as claimed in claim 15, wherein a total amount of addition of UV absorbent is in a range of 0.02 to 2.0 wt % relative to 100 wt % of the resin material.

19. The plastic lens as claimed in claim 15, wherein the plastic lens composition contains 0.01 to 10 ppm of a bluing agent.

20. The plastic lens as claimed in claim 15, wherein the plastic lens comprises an eye-glass lenses.

* * * * *